United States Patent [19]

Larson, III

[11] Patent Number: 5,165,414
[45] Date of Patent: Nov. 24, 1992

[54] POINTING ERROR COMPENSATION IN LARGE APERTURE ANNULAR ARRAYS

[75] Inventor: John D. Larson, III, Palo Alto, Calif.

[73] Assignee: Hewlett-Packard Company, Palo Alto, Calif.

[21] Appl. No.: 640,680

[22] Filed: Jan. 14, 1991

[51] Int. Cl.⁵ .............................................. A61B 8/00
[52] U.S. Cl. ........................... 128/660.08; 128/660.09; 73/620; 73/633
[58] Field of Search .................... 128/660.08, 660.09, 128/661.09, 662.03, 660.10; 73/620, 633, 625

[56] References Cited

U.S. PATENT DOCUMENTS

| | | | |
|---|---|---|---|
| 4,398,422 | 8/1983 | Haerten | 128/660.08 |
| 4,722,345 | 2/1988 | Ueno et al. | 128/660.09 |
| 4,896,672 | 1/1990 | O'Toole | 128/660.09 |
| 4,932,414 | 6/1990 | Coleman et al. | 128/660.09 |

Primary Examiner—Kyle L. Howell
Assistant Examiner—George Manuel

[57] ABSTRACT

In ultrasonic apparatus has a large aperture annular transducer array which is mechanically rotated in a scanning motion. The ultrasound beam is electronically steered to compensate for angular position error caused by the scanning motion by means of preselected delay patterns to thereby produce an ultrasound beam which undergoes a discrete step scan pattern of an object of interest. Also disclosed is a method of manufacturing the transducer array which involves segmenting the transducer after assembling the transducer components.

18 Claims, 6 Drawing Sheets

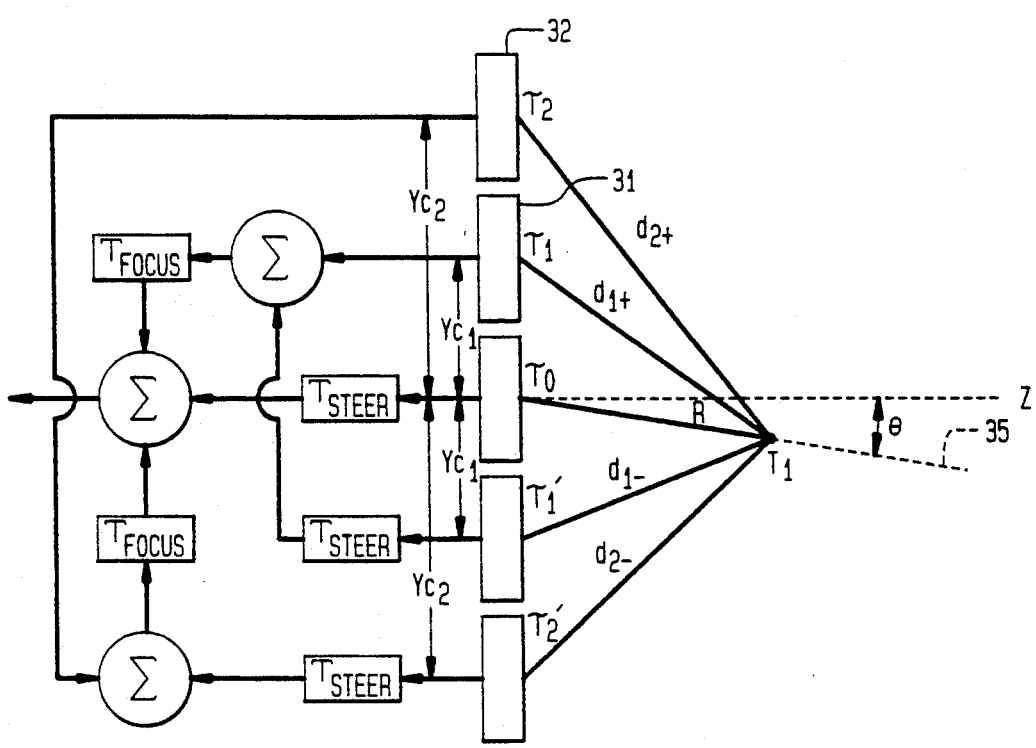
FIG. 3c
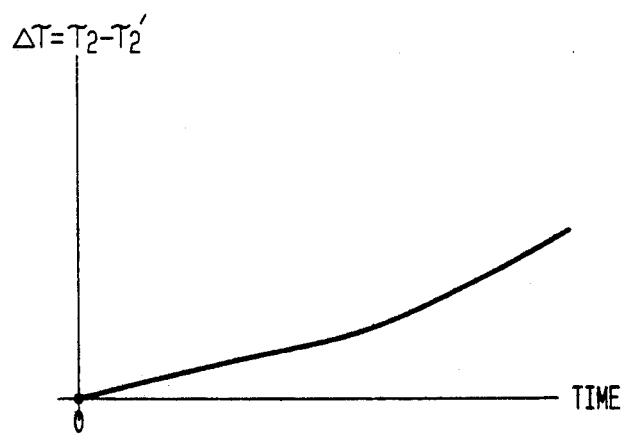

POINTING ERROR COMPENSATION IN LARGE APERTURE ANNULAR ARRAYS

BACKGROUND OF THE INVENTION

The present invention relates generally to ultrasound devices and more particularly to methods of operating large annular transducer arrays such as those used in medical ultrasound diagnostic equipment.

It is well known to use ultrasound equipment to examine the interior of an object such as a human patient. The ultrasound equipment radiates high frequency ultrasonic pulses toward a patient and these pulses are reflected by boundaries between body organs which have different tissue density and acoustic elasticity (different acoustic impedance). The reflected pulses are detected to obtain diagnostic information such as a 1-dimensional scan, 2-dimensional tomographic image, or 3-dimensional volume image of the organs. The ultrasound diagnostic method is relatively non-invasive so that the patient suffers little discomfort. Ultrasound does not expose the patient to substantial radiation risks as compared to conventional x-ray diagnostic equipment while efficiently imaging soft tissue.

Though the ultrasound equipment is principally used as medical diagnostic equipment, any material that has a varying acoustic impedance can be examined by ultrasound equipment.

Piezoelectric transducers or other suitable transducers transmit beams of ultrasonic energy toward an object of study and detect the reflections or echoes produced by the object. To complete the acoustic examination, the ultrasonic beam is mechanically and/or electronically scanned over the area of interest. Many electronically scanned ultrasound systems utilize linear or annular arrays of transducers. The transducer elements are excited to generate acoustic beams at many angles relative to the normal line of the array at its midpoint. Echoes returning from the object arrive at the transducer elements at different times necessitating the steering of the beam by delaying the received echo signals by different amounts so that all the signals from a given target point of the object are simultaneously summed. In addition to beam steering delays, electronic focusing is provided by delays to compensate for propagation path time delay differences from the transducer elements to the focus point. Thus, the transducer arrays focus or steer the acoustic beam, by the use of time delays or phase shift methods in the pulse transmission of the acoustic beams. The amount of beam steering and focal point position are governed by the amount of phase delay between the pulses transmitted by the transducer elements of the array.

In an effort to sharpen the focus of the transmitted beam and thereby increase the spatial resolution of information contained in reflected beams, large arrays are being used to generate and receive the ultrasound pulses. In an annular array transducer of large diameter (e.g., a disk diameter of 30 mm) and working at high frequencies (e.g., 4.5 MHz in a water medium) the width of the acoustic beam becomes very narrow. An example of the lateral resolution of an acoustic beam 10 generated by a transducer 12 is shown in FIG. 1a. For the above example, the frequency width at the half-maximum (FWHM) level is 0.64°, as represented by the beam profile 14. Referring to FIG. 1b, the transmitted beam 10 (also known as a drive beam or interrogation beam) propagates through a medium until it interacts with acoustical features such as targets $T_1$ and $T_2$ located along the beam axis 16. The reflected or echo pulses 18 are received by the transducer array at distinct time intervals which correspond to the respective depths of the targets in the object.

In order to provide a scan image of the target, the transducer 12 can be mechanically scanned by rotating it about an axis. FIG. 2 depicts a transducer array that is rotated about an axis 20 (perpendicular to the plane of the figure) to provide a mechanical scanning operation. The mechanical movement results in a loss of sensitivity due to angular position error. Angular position error is caused by the mechanical scanning motion of the transducer array during a time $t_{echo}$ or interrogation time. Time $t_{echo}$ is defined as the time period required for the echo of the transmitted pulse to be received by the array. Thus, a drive pulse 10 is transmitted while the transducer array is in the position indicated by the dash-line outline. The array continues its scanning motion and at a time $t_{echo}$, the echo pulse is received while the array is in the position indicated by the solid line outline. The loss of sensitivity is due to the fact that the reflected pulse 18 is now off-axis with respect to the transducer. Since the line normal to the array disk represents the direction of maximum sensitivity of the transducer array, any angular shift of the target away from the normal line represents a degeneration of the sensitivity of the system. In the receive mode, the echo pulse 18 interacts with the off-axis portion of the transducer array's beam profile, also depicted as line 14 for simplicity, and the detection of the received pulse is more difficult. It can be appreciated that as the size of the array is increased and the width of the beam becomes narrower, the loss of sensitivity will be greater. In the illustrated example, the received signal is about 10 dB weaker than a signal received in a non-scanned environment.

Another problem addressed by the present invention lies in the manufacturing process of the annular transducer array. The individual segments of the transducer array require a large contact area with the electrical leads and careful alignment with each other so that the segments and the contact areas do not contact each other (thereby creating destructive cross-talk) but are as closely adjacent to each other as manufacturing tolerances permit (thereby increasing relative resolution). Since the array ultimately includes at least four layers of material, namely a mounting cup, contact areas, piezoelectric crystal and an acoustic matching material, respectively, alignment of these layers can become arduous.

SUMMARY OF THE INVENTION

It is therefore one of the objects of the present invention to improve the sensitivity of ultrasound scanning array apparatus by reducing the effect of angular position error induced by mechanically scanning the array.

It is a further object of the invention to reduce the effect of angular position error by reducing the dependence of the apparatus' sensitivity on a line normal to the array.

It is yet another object of the invention to increase the scanning rate of ultrasound scanning arrays without reducing the sensitivity of the apparatus.

It is still another object of the invention to reduce the complexity of the manufacturing process of the annular array transducer.

Briefly, in accordance with the above objects, the present invention employs a retrograde electronic beam steering method which repoints the acoustical beam on a target as the array disk undergoes steady mechanical scanning. Through the use of preselected time delays in the transmission of ultrasound pulses in the transmit mode or preselected time delays in the processing of echo signals during a receive mode, the acoustic beam focus is continuously maintained on a target point during an interrogation period, thereby maintaining the sensitivity of the array. Although the electronic beam steering method of the present invention can be used in either transmission or receiving mode, its use in the receive mode is preferred. Also disclosed is a manufacturing process of the annular array transducer involving segmenting the transducer after assembling the transducer components.

BRIEF DESCRIPTION OF THE DRAWINGS

The objects and features of the invention will be more readily apparent from the following detailed description and appended claims when taken with the drawings in which:

DETAILED DESCRIPTION OF THE PREFERRED EMBODIMENTS

Basically, the objectives of the present invention are attained by segmenting the annuli of an annular array and electrically steering the acoustic beam a limited amount to adjust for the mechanical motion of the array disk 10. An example of a segmented annular array is shown in FIG. 3a.

Figure 1A:
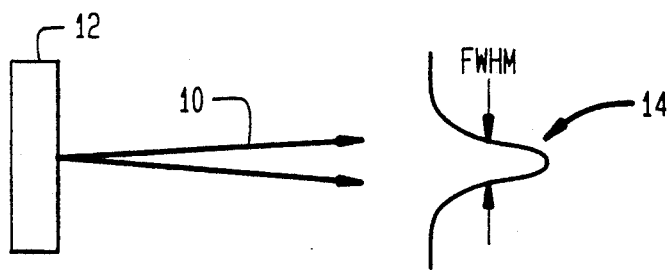
FIGS. 1a and 1b are schematic representations of a transducer for generating and receiving an acoustic beam.
Figure 1B:
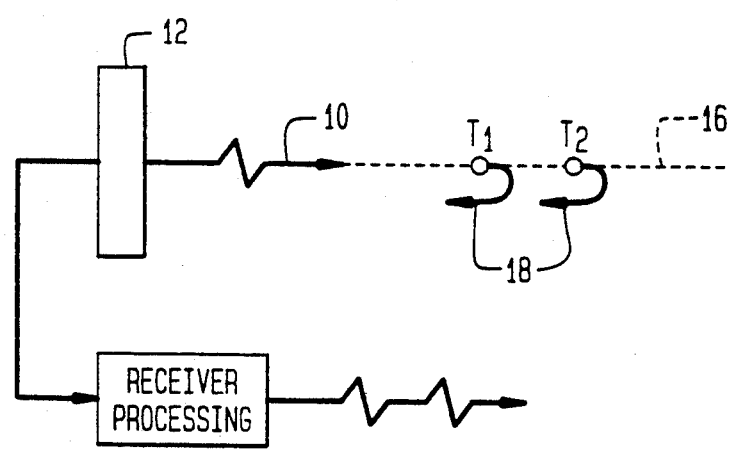
Figure 2:
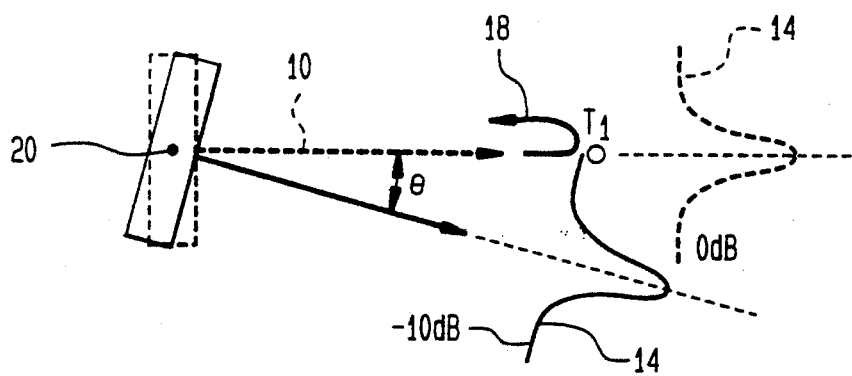
FIG. 2 diagrammatically depicts the underlying physics causing a loss of sensitivity of the transducer arrays.
Figure 3A:
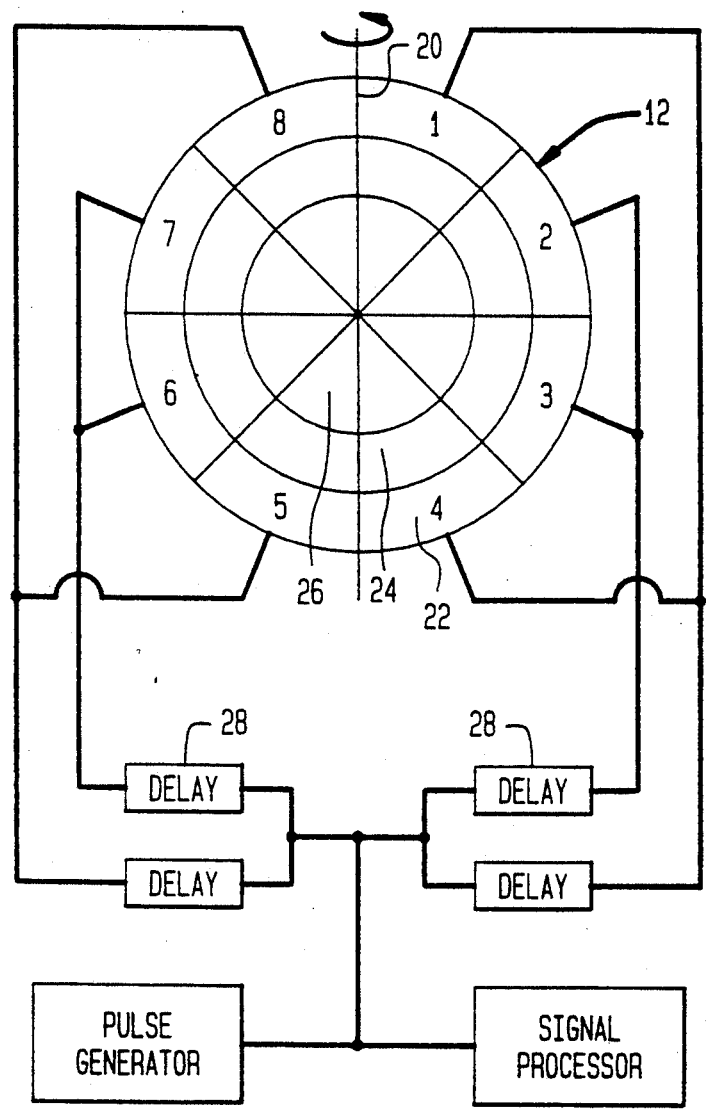
FIGS. 3(a-c) are schematic illustrations of an annular array.

As depicted in FIG. 3a, an annular transducer 12 comprises an array of concentric transducer elements 22, 24, 26. Each element is segmented in a circumferential direction, with eight segments being shown in the illustrated example. During operation, array segments 1-4 will be spatially further from a given target T than will segments 5-8 as the transducer rotates about an axis 20 in the indicated direction. Since segments 1 and 4, 2 and 3, 5 and 8, and 6 and 7, are symmetrically disposed, they can be electronically coupled to common signal channels and supplied with the same phase delay. Each pair of segments of a channel can share an adjustable delay line 28 for phasing the entire array for focusing and steering the acoustic beam to an angle off the normal line of the array disk.

Figure 3B:
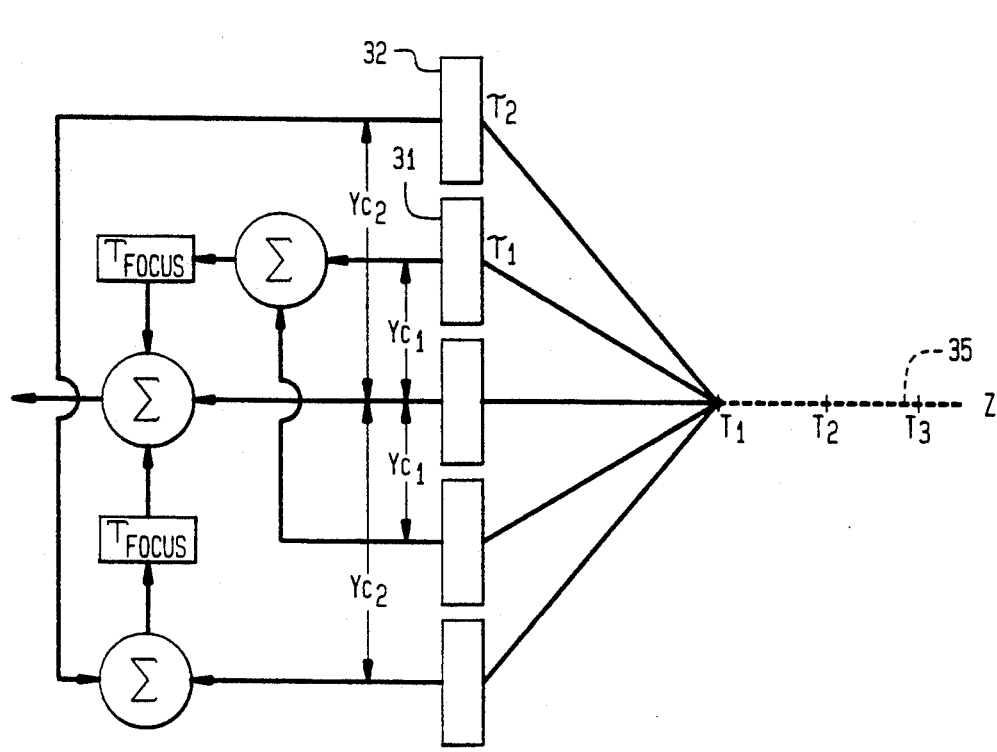
Figure 3B:
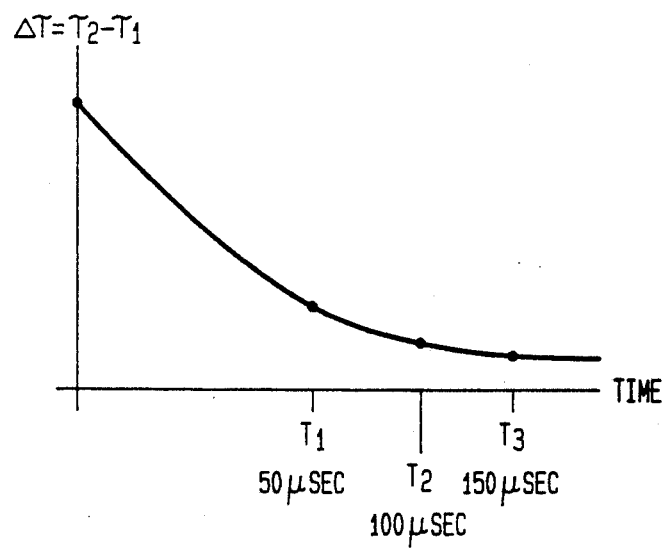

FIG. 3b depicts the effect of the relative delays in the separate channels on the focusing of acoustical beam 10 in the receive mode in comparison to a graph of $\Delta \tau$ versus interrogation time $\tau$. The interrogation time is proportional to the focal distance of the array. Thus, if a target $T_1$ is a few centimeters from the array, the interrogation time along the array axis would be a few microseconds (eg. 50 $\mu s$). Deeper targets have correspondingly longer interrogation times, as seen in FIG. 3b. In operation, the focus is progressively moved along an interrogation line representing an interrogation cycle. Array segments 32 located further off-axis have correspondingly larger interrogation times than the interrogation time of segments 31 located closer to the central axis of the array. A quantity $\Delta \tau = \tau_2 - \tau_1$, represents the difference in interrogation times and therefore the delay time required to focus the acoustical beam.

As shown in FIG. 3b, the delay is placed on the off-axis array segments in the example of a five segment array in the receive mode. In the transmit mode, the delay would be placed on an off-axis array segment as well. The outputs of the array segments are thereby selectively delayed and summed to form image data in the receive mode. The graph of FIG. 3b shows generally how $\Delta \tau$ varies with time so that the focal point can progress along an interrogation line 35.

In accordance with the present invention, the delay lines for the individual channels can be adjusted relative to one another to dynamically and electronically steer the beam in a direction and amount related to the mechanical scan motion during the interrogation time period required for a pulse to be transmitted and returned from a target or during an interrogation cycle wherein the focal point progresses along an interrogation line. When the electronic steering is employed in the transmit mode, such steering is in the same direction as the mechanical motion of the array, so that the transmitted pulse is in advance of the center axis of the array and the returned pulse will be on-axis when it is received by the array. In the receive mode, the electronic steering is in a direction opposite to the direction of movement of the array, so that the array is effectively "looking at" a point behind its central axis in the direction of the scan.

As depicted in FIG. 3c the pulse steer delays $T_{steer}$ are progressively larger from one side of the array to the other (in a direction normal to the axis of rotation) so that the focus of the beam remains on the target point $T_1$, or interrogation line 35, as the axis of the array moves toward or away from the target point $T_1$, or interrogation line 35, due to the mechanical rotation of the transducer disk. The net effect of the combined mechanical and electrical scanning keeps the array beam pattern pointed in a fixed direction during the interrogation cycle without having to mechanically start and stop the rotation of the disk. At the start of a new cycle, the array is focussed along a different interrogation line or target. The retrograde steering process keeps the array focus on a single interrogation line or target point during the period required to complete the interrogation despite the continued mechanical rotation of the array disk. The graph of FIG. 3c depicts the variation of the delay $\Delta \tau$ between two symmetric array segments as a function of time.

Figure 4A:
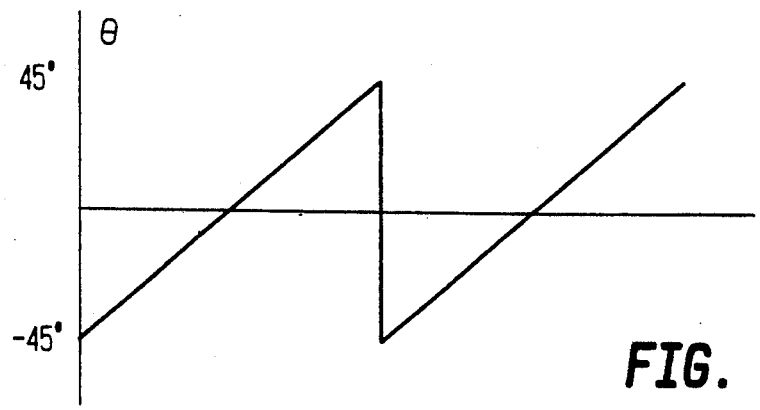
FIGS. 4(a-c) are graphs of the relative angular changes of the acoustic beam over time.
Figure 4B:
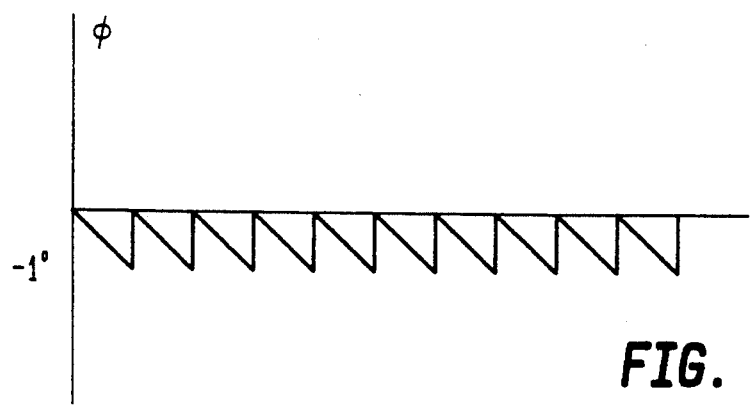
Figure 4C:
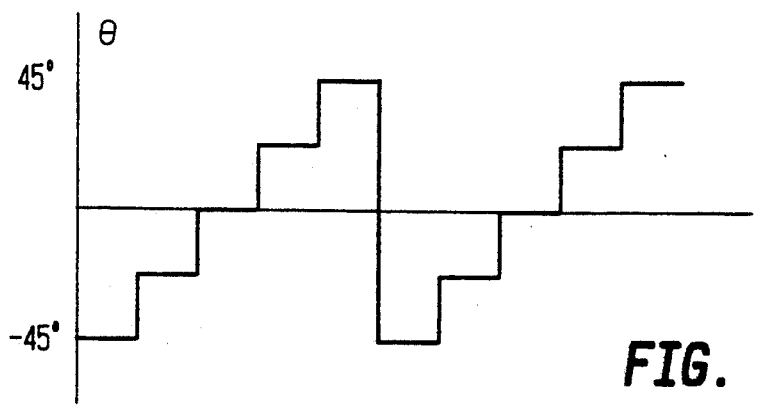

FIGS. 4a-4c summarize the retrograde steering effect in the receive mode of operation. FIG. 4a graphically represents the mechanical motion of the transducer as it passes through a range of angles comprising a plurality of interrogation cycles, thus completing an examination of the area of interest. FIG. 4b graphically represents the electronic steering of the acoustic beam during each cycle. The effects of mechanical scanning and electronic steering of the beam are additive and FIG. 4c graphically represents the net effect of mechanical transducer rotation when electronic steering is included. As can be seen, the result is a discrete stepping of the acoustical beam which mimics an intermittent step mechanical scan.

FIG. 3c depicts a distance d which is the distance between a point of reception (or transmission depending on the mode) on the array and the target point and is defined by the following equations:

$$d_+^2(\Theta) = R^2 + Y_c^2 + 2RY_c \sin\Theta \text{ and,} \quad (1)$$

$$d_-^2(\Theta) = R^2 + Y_c^2 - 2RY_c \sin\Theta \quad (2)$$

wherein, as depicted in FIG. 3c, R is a distance between the midpoint of the surface of the piezoelectric crystal and a target point T adjacent or on the Z axis, Yc is the distance from the midpoint of the array to a point of reception or transmission on the array, $\theta$ is the angle that the array moves through during an interrogation period due to the annular velocity of the array, and the subscripts on d represent whether the point of reception is along the positive y axis or the negative y-axis.

The equations 1) and 2) can be factored into the following equations:

$$d_+(\theta) = R\sqrt{1 + (Y_c/R)^2 + (2Y_c/R)\sin\theta} \quad 3)$$

$$d_-(\theta) = R\sqrt{1 + (Y_c/R)^2 + (2Y_c/R)\sin\theta} \quad 4)$$

Since typically $R \gg Y_c$, then the factor $(Y_c/R)^2$ can be ignored and the equations simplify by a square-root approximation to $$d_+(\Theta) = R[1 + \tfrac{1}{2}Y_c/R \sin\Theta] \quad (5)$$

$$d_-(\Theta) = R[1 - \tfrac{1}{2}Y_c/R \sin\Theta] \quad (6)$$

The total transmit time for a pulse is equal to $$\tau_+ = d_+/R_o + R/C_o, \text{ and} \quad (7)$$

$$\tau_- = d_-/R_o + R/C_o \quad (8)$$

wherein Co is the speed of sound in the selected medium and Ro is the component distance along the Z-axis to the target point $T_1$.

The steering delay time to be inserted into the circuitry is therefore $$T = \tau_+ - \tau_- \quad (9)$$

Using a specific example wherein the array is scanning at a specific annular velocity $\Omega = \dot\Theta$ and for a time t=0, $\Theta = 0$ then after an interrogation period (=2R/Co) the angular position would be $$\Theta = \Omega(2R/C_o) \quad (10)$$

Then combining equations 5 and 6 with 7 and 8, respectively, the results are:

$$\tau_+ = R/C_o(1 + Y_c/R \sin\Theta) + R/C_o, \text{ and} \quad (11)$$

$$\tau_- = R/C_o(1 - Y_c/R \sin\Theta) + R/C_o \quad (12)$$

and by inserting equations 11 and 12 into equation 9, equation 9 reduces to $$T = 2R/C_o((Y_c \sin\Theta)/R) \quad (13)$$

in which equation 10 is combined to form $$T = 2Y_c/C_o \sin(\Omega.2R/C_o) \quad (14)$$

to give the steering delay time to be inserted into the processing circuitry.

Figure 5A:
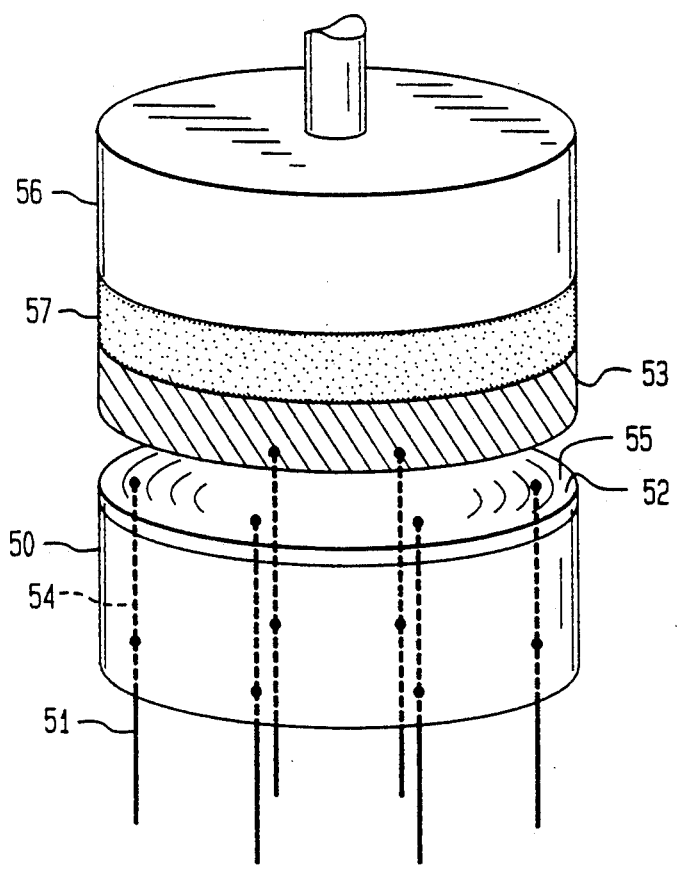
FIGS. 5(a-b) diagrammatically depict the manufacturing steps involved producing the annular array.
Figure 5B:
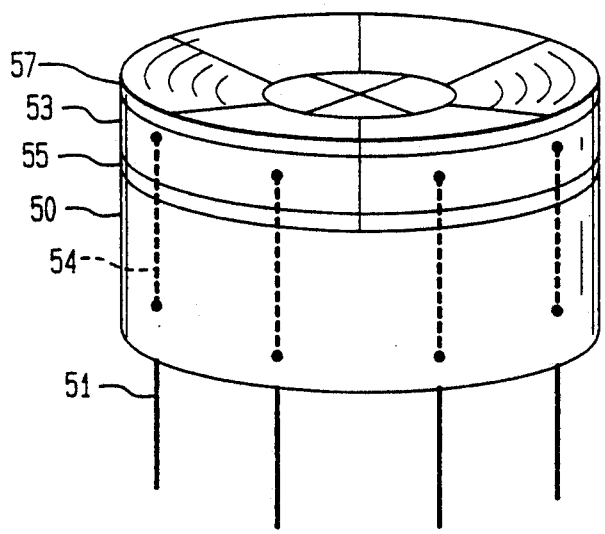

The annular transducer array may be manufactured by the process depicted in FIGS. 5a and 5b. A plastic mounting cup 50 has a concave surface 52 for accepting a concave piezoelectric crystal 53. The cup 50 is provided with a plurality of through passes 54 between the concave surface and another surface to receive electrical leads 51. The electrical leads 51 serve to electrically connect the piezoelectric crystal 53 to the circuity of the ultrasound device when the assembly is complete. Once the leads 51 are in place, with a small portion extending beyond the concave surface 52, a conductive layer 55 comprised of a chromium silver alloy is deposed on the concave surface 52. The conductive layer 55 may be deposited by any suitable technique (e.g. electroplating, vacuum deposition etc.).

The concave piezoelectric 53 crystal is mounted to a mandrel 56 via a wax layer 57. After piezoelectric crystal 53 is mounted to the mandrel 56 it is brought into contact with the conductive layer 55. The crystal 53 and the conductive layer 55 are abrasively rubbed together to smooth the contacting surfaces, thereby providing an increased and extensive contact area. The wax layer 57 not only serves to adhere the crystal 53 to the mandrel 56, but also acts as a governor of the abrasive action. As heat due to the rubbing friction builds in the crystal 53, the wax melts gradually thereby reducing the adhesive force of the wax and subsequently permitting the crystal to "slip" or move relative to the movement of the mandrel 56. The amount of abrasive action is thereby limited and neither the crystal 53, nor the conductive layer 55 or cup 50 can be damaged by excessive heat.

As shown in FIG. 5b, when abrasive action is complete, the crystal is mounted to the cup via the conductive layer, the mandrel and wax layer are removed, and a layer of acoustical matching material 57 is deposited on the concave surface of the crystal 53. The acoustical matching material 57 assures low attenuation of the acoustical signals as they enter and leave the crystal 53 to and from another medium.

Once the transducer assembly is completed, a transducer array pattern is imposed on the concave surface of the assembly. The pattern can be formed by well-known masking or other lithographic techniques, e.g., cutting tools, chemical etching, (not shown). Etching or other form of abrasive technique is performed to form the segments of the array by selectively removing portions of the acoustical matching layer, crystal and conductive layer. The masking and etching technique facilitates the accurate alignment of the segments of each layer, simplifies the assembling steps and permits the array segments to be as closely adjacent as the lithographic process permits.

While the invention has been described with reference to the figures and preferred embodiment, it will generally be understood by those skilled in the art that various changes may be made and equivalents may be substituted for the elements thereof without departing from the spirit and scope of the invention. For example, the transmitted pulses can be electronically steered so that they are in advance of the axis of the transducer, i.e., the subsequently reflected pulses travel substantially along the transducer axis 16. Alternatively, the pulses can be initially transmitted along the axis of the transducer, and the transducer electronically steered during the receive mode to be more sensitive to reflected pulses that are behind the transducer axis relative to the direction of scan.

What is claimed is:

1. A method of operating an ultrasound apparatus, comprising the steps of:
   transmitting a beam of ultrasound energy from a transducer array and receiving a reflected beam of ultrasound energy at said array:
   mechanically scanning the transducer array in a preselected direction through a predetermined range of angles during the transmission and reception of said beams; and
   electronically steering said transducer array to compensate one of the transmitted and received beams for a change in the angular position of said transducer array caused by the motion of said mechanical scanning during the time between transmission of a beam of ultrasound energy and reception of the reflected beam.

2. The method of operating an ultrasound apparatus according to claim 1, wherein:
   said transducer array is comprised of a plurality of transducer array elements for generating the transmitted beam of ultrasound energy; and
   said electronic steering includes the step of selectively delaying the transmission of ultrasound energy from said transducer array elements.

3. The method of operating an ultrasound apparatus according to claim 2, wherein:
   said transmitted beam is steered in the same direction as the direction of said mechanical scanning.

4. The method of claim 3 wherein the transmitted beam is in advance of an axis normal to said transducer array, relative to the direction of mechanical scanning of said array.

5. The method of operating an ultrasound apparatus according to claim 1, wherein:
   said transducer array is comprised of a plurality of transducer array elements for converting received beams of ultrasound energy into electrical signals; and
   said electronic steering includes the step of selectively delaying electrical signals corresponding to reflected ultrasound energy received by said transducer array elements.

6. The method of operating an ultrasound apparatus according to claim 5, wherein:
   said transducer array is steered in a direction opposite to said direction of mechanical scanning.

7. The method of claim 6 wherein the transducer array elements are focussed upon an area located behind an axis normal to said transducer array, relative to the direction of mechanical scanning of said array.

8. The method of claim 1 wherein said transducer array is moved continuously during said step of mechanical scanning.

9. An ultrasound apparatus for examining an object, comprising:
   a transducer for transmitting soundwaves toward said object and for receiving soundwaves reflected from said object;
   mechanical scanning means for rotating said transducer through a preselected range of angles during the transmission and reception of soundwaves;
   delay means for selectively delaying at least one of the transmitted and received soundwaves to compensate for a change in the angular position of said transducer caused by the rotation of said transducer during the time between transmission of a soundwave and reception of the reflected soundwave.

10. The ultrasound apparatus according to claim 9, wherein:
    said transducer comprises a plurality of transducer elements for generating ultrasonic energy and said delay means delays the ultrasonic energy generated by said some of transducer elements relative to the energy generated by other transducer elements to thereby transmit soundwaves in a direction which is in advance of the rotational movement of the transducer.

11. The ultrasound apparatus according to claim 10, wherein:
    said transducer comprises an annular array.

12. The ultrasound apparatus according to claim 11, wherein:
    said annular array is segmented into a plurality of segments; and
    said segments are symmetrically disposed about a line perpendicular to a rotation axis of said transducer array and are electronically coupled together to form delay line channels.

13. The ultrasound apparatus according to claim 12, wherein:
    said channels are individually coupled to respective delay lines.

14. The ultrasound apparatus according to claim 9, wherein
    said transducer comprises a plurality of transducer elements for converting received soundwaves into electrical signals and said delay means delays the electrical signals from some of said transducer elements relative to the electrical signals from other transducer elements to thereby detect soundwaves which are reflected from a location that is behind an axis normal to a face of said transducer with respect to the direction of rotation of said transducer.

15. The ultrasound apparatus according to claim 14, wherein:
    said transducer comprises an annular array.

16. The ultrasound apparatus according to claim 15, wherein:
    said annular array is segmented into a plurality of segments; and
    said segments are symmetrically disposed about a line perpendicular to a rotation axis of said transducer array and are electronically coupled together to form delay line channels, 17. The ultrasound apparatus according to claim 16, wherein:
    said channels are individually coupled to respective delay lines.

18. The apparatus of claim 9 wherein said mechanical scanning means rotates said transducer continuously during the transmission and reception of soundwaves.

* * * * *